United States Patent
Ito

(10) Patent No.: US 6,542,471 B1
(45) Date of Patent: Apr. 1, 2003

(54) RADIO COMMUNICATION SYSTEM FOR MOBILE OBJECTS AND RADIO COMMUNICATION MOBILE STATION USED IN THE SYSTEM

(75) Inventor: Toru Ito, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/144,349

(22) Filed: Aug. 31, 1998

(30) Foreign Application Priority Data

Sep. 24, 1997 (JP) .............................. 9-258274

(51) Int. Cl.⁷ ............................................. H04L 12/26
(52) U.S. Cl. .................... 370/252; 370/335; 455/238.1
(58) Field of Search ............................... 370/252, 332, 370/335, 342, 464, 465, 479; 455/441, 238.1, 10, 504, 63, 506; 375/140, 141, 146, 147, 346

(56) References Cited

U.S. PATENT DOCUMENTS

| | | | | |
|---|---|---|---|---|
| 5,267,261 A | * | 11/1993 | Blakeney, II et al. ....... | 370/332 |
| 5,396,645 A | * | 3/1995 | Huff ........................... | 455/441 |
| 5,711,005 A | * | 1/1998 | Farrag ........................ | 455/441 |
| 5,883,899 A | * | 3/1999 | Dahlman et al. ........... | 370/468 |
| 6,014,566 A | * | 1/2000 | Owada ........................ | 455/444 |
| 6,038,444 A | * | 3/2000 | Schipper et al. ............ | 455/421 |
| 6,208,861 B1 | * | 3/2001 | Suzuki ........................ | 455/441 |
| 6,335,923 B2 | * | 1/2002 | Kubo et al. ................. | 370/335 |

FOREIGN PATENT DOCUMENTS

| | | |
|---|---|---|
| DE | 197 29 424 | 2/1998 |
| JP | 01-149627 | 6/1989 |
| JP | 06-276176 | 9/1994 |
| JP | 8-149543 | 6/1996 |
| JP | 08-167860 | 6/1996 |
| WO | WO95/03652 | 2/1995 |

* cited by examiner

*Primary Examiner*—Chau Nguyen
*Assistant Examiner*—D. Trinh
(74) *Attorney, Agent, or Firm*—Finnegan, Henderson, Farabow, Garrett & Dunner, L.L.P.

(57) ABSTRACT

Between communication equipment to be loaded in a vehicle and a base station, CDMA data communication is performed. A speed sensor detects a traveling speed. When the speed sensor crosses a speed determining value, a communication speed is changed. When the vehicle is at a halt or travels at a low speed, the communication speed is set to be high. When the traveling speed exceeds the speed determining value resulting from acceleration, the communication speed is decreased. Satisfactory communication is performed in the whole speed range, and data communication can be performed at the maximum speed. In order to change the communication speed, for example, a chip rate of PN code is changed. Also, the number of PN codes to which parallel processing is simultaneously applied is changed. Thus, it is possible to set the communication speed to be high even in a high-speed mobile object.

16 Claims, 8 Drawing Sheets

CONTROL FLOW ON THE VEHICLE SIDE

RADIO COMMUNICATION SYSTEM FOR MOBILE OBJECTS AND RADIO COMMUNICATION MOBILE STATION USED IN THE SYSTEM

BACKGROUND OF THE INVENTION

1. Field of the Invention

The present invention relates to a CDMA (Code Division Multiple Access) radio communication system for mobile objects, in particular, a system suitable for high-speed mobile objects, such as a vehicle.

2. Description of the Related Art

Heretofore, digital mobile communication systems have been used for telephones and data transmission. In such conventional mobile communication systems, a TDMA (Time Division Multiple Access) system or an FDMA (Frequency Division Multiple Access) system is used. Thus, multiple access is realized by physically dividing a time period and a frequency.

Lately, the CDMA system has been proposed and its development is in progress. In the CDMA system, a plurality of mobile stations simultaneously use the same frequency band. Further, multiple access is realized by using codes based on spread spectrum communication technology. For example, in DS (direct sequence) type spectrum diffusion, the diffusion modulation and demodulation of communication signals is performed using PN (pseudorandom noise) codes. By allocating a different PN code to each user, it is possible for a plurality of users to perform their respective communication using frequencies in the same band.

Adoption of the CDMA system can lead to sharp improvement in frequency efficiency compared with the conventional systems. In other words, the number of mobile stations capable of being simultaneously connected with the base stations can be increased. Therefore, the CDMA system is expected to be a system for coping with the increase of subscribers which is a type of problem in mobile communication systems. Moreover, the CDMA system has come to public notice due to its advantages that it has high confidentiality, soft hand-off between base stations is possible, and the like.

In the CDMA communication, a communication speed capable of securing stable communication is limited depending on the traveling speed of a mobile object. Therefore, when a mobile object which travels at a high speed, such as a vehicle, was provided with a mobile station, a communication speed had to be set at a sufficiently low value. This made it difficult to meet the needs for high speed communication. This problem will be subsequently explained exemplifying a vehicle as a mobile object.

In the CDMA system like other communication technologies, it is desired to make the communication speed as high as possible. The CDMA system is applied to mobile computing and data transmission is carried out between a terminal device on the mobile station side and a base station. Due to simultaneous data transmission of dynamic images, static images, voice, and the like, an amount of data to be transmitted tends to be increasing. Thus, it is required to perform high speed and accurate transmission for the following reasons: there is a need to reduce communication expenses by shortening a data transmission time; in the case of mobile objects, it may be limited in a time period which is possible to maintain continuous connection.

As is the case with a portable terminal for pedestrians, if it is assumed that communication would be performed in a stationary state or a state of traveling at a low speed, the communication speed of the CDMA system can be set at a considerably high speed. Even in the case of a vehicle, if it is at a standstill or traveling at a low speed, similar high speed communication can be performed. However, if the traveling speed is accelerated during high speed communication, the communication cannot be normally performed. This is because, as will be explained later, Doppler shift exerts more influence on the communication, for example. Therefore, if it is assumed that the terminal would be used in a vehicle, the communication speed will have to be set at a low speed.

For reference, in the conventional systems using the TDMA and FDMA systems, it is planned to transmit data at a high speed by simultaneously allocating a plurality of data channels to each user. For example, in the case of PDC (Personal Digital Cellular) in Japan, a transmission speed of 9.6 Kbps is accelerated to 28.8 Kbps in digital mobile communication.

Further, also in the conventional systems, a maximum data transmission speed can be obtained in mobile computing performed on the assumption that data is transmitted to a portable terminal carried by an ordinary pedestrian or a portable terminal in a stationary state. However, if the traveling speed of a terminal is 10 Km/h or more during communication, as is the case with vehicles, it will be difficult to realize a transmission speed similar to the speed at the time of standstill or traveling at a low speed. Therefore, this will cause such a problem that it is difficult to meet the need of restricting the transmission time.

Japanese Patent Laid-Open Publication No. Hei 8-149543 relates to a PHS (Personal Handyphone System). As is well known, in the PHS, the TDMA or FDMA system is used. According to the Publication mentioned above, a traveling speed of a mobile object is detected based on an input signal transmitted from a GPS (Global Positioning System) satellite. When the traveling speed reaches a certain value or more, an alarm is given to a user of the mobile terminal to inform that it will be difficult to perform communication. In this case, the user cannot continue the communication without decreasing the traveling speed. In other words, the user cannot continue the communication while traveling at a high speed.

The subject is now returned to the CDMA communication system for mobile objects. In the CDMA system, the communication speed is restricted depending on the traveling speed of a mobile object as described above. Specially in a wide band CDMA (W-CDMA or Wide-CDMA) system, between a terminal device for pedestrians used only at a low traveling speed and a terminal device for mobile objects, such as a vehicle, there is a big difference in communication speed which can be set. The communication speed of the former is several times as high as that of the latter. Therefore, there is a complete difference in environment of mobile computing during the CDMA communication between these two types of terminal devices. In particular, as is the case with ITS (Intelligent Transport Systems) technology, data communication in vehicles tends to be becoming more and more important. Thus, it is desired to make a data communication speed as high as possible.

The Doppler shift is one of the reasons why the communication speed is restricted depending on the traveling speed. When the traveling speed is high, the Doppler shift exerts an influence on inverse diffusion in diffusion demodulation. In particular, if the traveling speed is not constant and always changes, like the case with vehicles, it will be difficult to follow the Doppler shift as will be described hereunder.

If the DS system is adopted, as described above, the diffusion modulation and the demodulation is performed using PN codes. In the case of vehicles, the PN codes are rendered correlative by a diffusion demodulation process (inverse diffusion). The PN codes have waveforms in which normally pseudo +1 or −1 appears at random, as shown in FIG. 8. A waveform corresponding to one +1 or −1 is referred to as a chip. A time period of maintaining one chip is referred to as a chip time. The number of chips per unit time is referred to as a chip rate. The chip rate and the bandwidth of communication signal correspond to each other. Thus, if the chip rate becomes great, the bandwidth will become wide.

Here, with the increase of the communication speed, the chip rate and the bandwidth become great. For example, the communication speed is faster when the chip rate is 4.096 Mbit/s than when it is 1.024 Mbit/s. If the chip rate is high, the chip time (time length per chip) will become short. On the other hand, if the range of fluctuation of traveling speed is large like vehicles, fluctuation of the Doppler shift will be large. If the communication speed is set at a high speed, fluctuation of the Doppler shift will be relatively large compared with the chip time. Therefore, when it was conventionally desired to perform the CDMA communication in a vehicle, there was no option but to restrict the communication speed.

SUMMARY OF THE INVENTION

The object of the present invention is to provide a radio communication system for mobile objects, such as a vehicle, whose traveling speed reaches high speed. In the system of the present invention, the CDMA communication can be satisfactorily carried out in the whole speed area, and the communication speed can be accelerated.

(1) In order to achieve the object mentioned above, a radio communication system for mobile objects according to the present invention is a system to carry out the CDMA radio communication between a mobile station and a base station, and comprises traveling speed detecting means for detecting a traveling speed of the mobile station, determining means for comparing the traveling speed with a prescribed speed determining value, and communication speed changing means for changing a communication speed between the base station and the mobile station when the traveling speed crosses the prescribed speed determining value.

Preferably, a radio communication system for mobile objects according to the present invention comprises a mobile station and a base station. The mobile station comprises traveling speed detecting means for detecting a traveling speed of the mobile station, determining means for comparing the traveling speed and a prescribed speed determining value, requesting means for requesting the base station to change a communication speed when the traveling speed crosses the prescribed speed determining value, and mobile station communication speed changing means for changing a communication speed on the mobile station side. The base station has base station communication speed changing means for changing a communication speed on the base station side at the request of the mobile station. The mobile station communication speed changing means of the mobile station changes a communication speed on the mobile station side adjusting to the change of the communication speed on the base station side.

According to the present invention, when the traveling speed is low, the communication speed is set at a high speed. When the traveling speed exceeds a predetermined reference speed value, the communication speed is changed to low. Thus, even though the traveling speed of the mobile object becomes high due to acceleration while performing high speed communication, the quality of communication will not be deteriorated. On the contrary, if the traveling speed becomes lower than a predetermined speed value due to deceleration of the mobile object, the communication speed will be changed to high. Therefore, the communication speed is accelerated according to deceleration of the mobile object, whereby data communication can be completed in a short time. Thus, according to the present invention, it is possible to perform satisfactory communication in the whole speed range of the mobile object, and it is possible to perform the communication as speedily as possible by setting a suitable communication speed in each traveling speed area. Suitable communication can be performed regardless of the traveling speed of the mobile object. Thus, in the CDMA communication, it is possible to make full use of the advantage of mobile communication that data communication can be performed in an arbitrary area The present invention is suitable for the CDMA communication to which the direct sequence (DS) type spectrum diffusion described above is applied, as well as communication to which other types of spectrum diffusion are applied. These are, for example, frequency hopping (FH), time hopping (TH), or hybrid (DS/FH).

Further, the number of predetermined speed values and the number of steps to change the communication speed may be singular or plural. If a large number of predetermined speed values are set and the number of steps to change the communication speed is increased, the communication speed can be successively changed.

(2) Preferably, in the system according to the present invention, when the communication speed is changed, the chip rate of PN code or the bandwidth of a communication signal is changed.

If the chip rate of PN code is changed, the communication speed will change accordingly. If the chip rate is high, the communication speed will be also high. Further, if the chip rate is high, there will be a harmful influence of the Doppler shift while traveling at a high speed. According to the present invention, when the traveling speed is low, high speed communication will be carried out by increasing chip rate. When the traveling speed becomes high, the chip rate is lowered. Thus, the communication is satisfactorily performed while traveling at a high speed. The bandwidth of communication signal corresponds to the chip rate, so that if the chip rate is changed, the bandwidth will also be changed. Therefore, in changing the communication speed, the bandwidth may also be changed.

It is preferable to realize a change of the chip rate by deforming the PN code, as well as changing the PN code itself. In the latter case, the PN code to be used differs depending on whether the traveling speed is low or high.

(3) Preferably, in the system according to the present invention, communication can be performed between a mobile station and base station simultaneously using a plurality of PN codes, and the number of the PN codes simultaneously used is changed in changing the communication speed.

This aspect relates to a constitution in which the CDMA communication speed is increased more than it used to be. In this aspect, a plurality of PN codes are simultaneously used between a mobile station and a base station. Thus, compared with the case where a single PN code is used, the communication speed becomes high in proportion to the number of PN codes used. However, it is difficult to simultaneously process a plurality of PN codes unless the traveling speed of the mobile object is low. It is considered that fading is influential on this difficulty. As is well known, fading is a phenomenon in which an amplitude and a phase of an input signal fluctuate due to the influence of buildings or the like and it mainly results from multipaths. Instantaneous interruption (burst noise) at the time of traveling in the shade of an obstacle, such as a building, is also a cause of fading. Due to the influence of such fading, the number of PN codes enabling stable communication process will be limited if the traveling speed is high.

Therefore, when a plurality of PN codes are used, it is desired to solve the problem mentioned above. In other words, if it is assumed that the mobile object is at a standstill or travels at a low speed, a large number of PN codes can be set and high speed communication is possible. However, in order to apply to high-speed mobile objects, a small number of PN codes have to be set. Thus, the communication speed cannot be high.

However, according to the present invention, when the mobile object travels at a low speed, high speed communication can be performed as a relatively large number of PN codes are simultaneously processed. If the traveling speed becomes high, the number of PN codes will be reduced. Thus, satisfactory communication can be performed without being influenced by fading. On the contrary, if the traveling speed becomes low, high speed communication can be performed by increasing the number of PN codes. Thus, according to the present invention, satisfactory communication can be performed in the whole speed area, and it is possible to perform communication as speedily as possible by setting an appropriate number of PN codes in each traveling speed area.

The aforementioned aspect (3) may be applied to communication systems together with the constitution (2). It is also preferable to apply only the aspect (3) without applying the constitution (2).

(4) Preferably, in the communication system according to the present invention, a degree of spectrum diffusion is changed in changing the communication speed. In spectrum diffusion, a signal primarily modulated is further secondarily modulated using the DS system, FH system or the like described above, whereby the bandwidth is widened. The degree of spectrum diffusion is a ratio of the bandwidth after the secondary modulation to the bandwidth before the secondary modulation in the spectrum diffusion. When the degree of diffusion is changed, the communication speed is changed. Thus, an effect of the present invention is obtained. For example, as explained in the aforementioned aspect (2), a change of the degree of diffusion can be realized by changing the chip rate of PN codes. Besides, the degree of diffusion can be varied by changing the process in the secondary modulation.

DESCRIPTION OF PREFERRED EMBODIMENTS

First Embodiment

Figure 1:
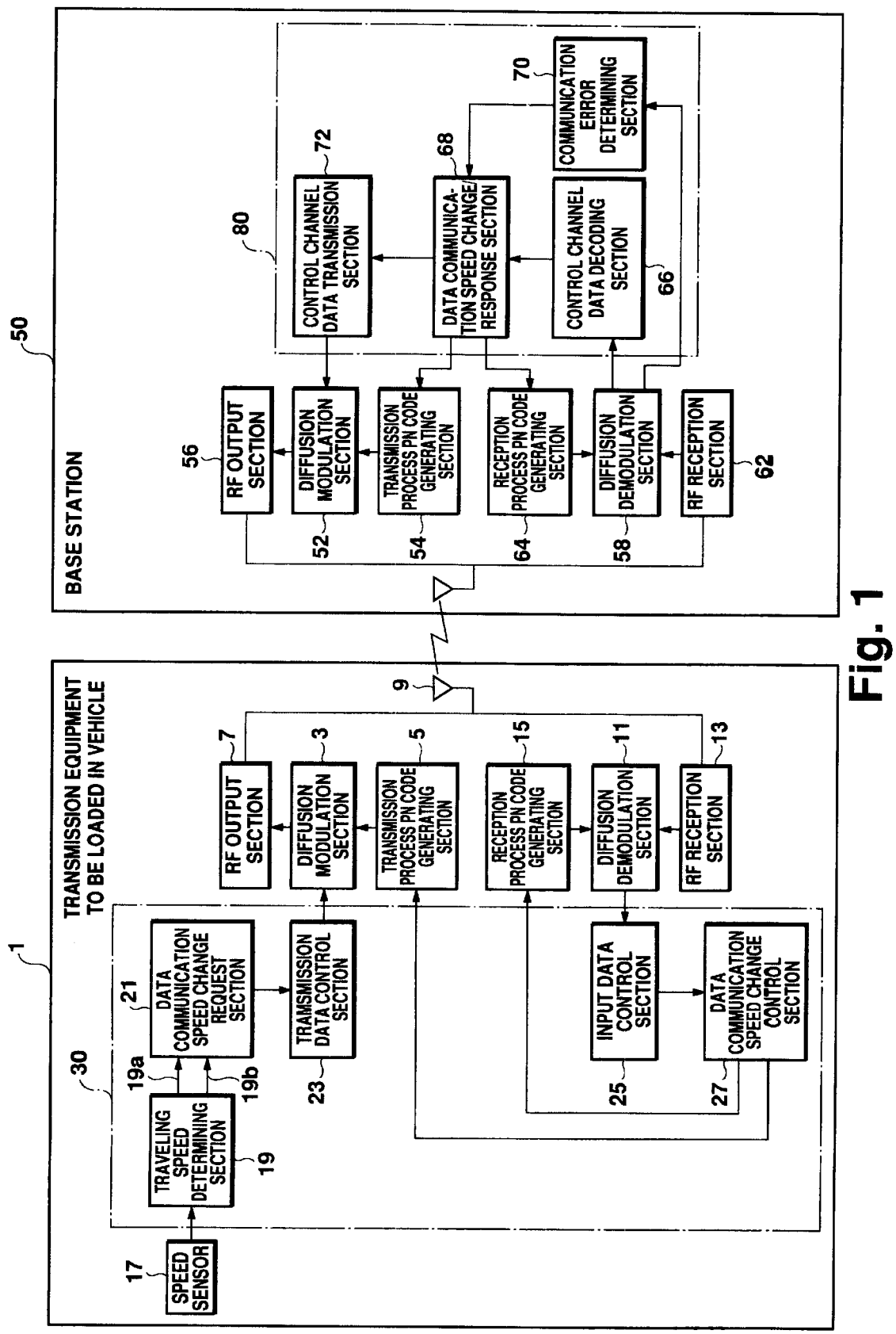
FIG. 1 is a block diagram showing the overall constitution according to an embodiment of the present invention.

A preferred embodiment of the present invention will be described below with reference to accompanying drawings. FIG. 1 is a block diagram showing the overall constitution. The radio communication system for mobile objects according to this embodiment has communication equipment to be loaded in a vehicle 1 and a base station 50. The communication equipment to be loaded in a vehicle 1 corresponds to a mobile station of the present invention. The communication equipment to be loaded in a vehicle 1 is fitted to a mobile terminal device, and the mobile terminal device is loaded in a vehicle. In the system according to the present invention, a data transmission is performed between the mobile terminal device and the base station 50 through W-CDMA communication which utilizes the DS type spectrum diffusion.

In FIG. 1, the communication equipment to be loaded in a vehicle 1 is provided with a diffusion modulation section 3, a transmission process PN code generating section 5, and an RF output section 7. This is the same constitution as that of conventional CDMA communication devices. In the diffusion modulation section 3, the primary modulation and secondary modulation of the spectrum diffusion communication are performed. Data to be transmitted is inputted into the diffusion modulation section 3. First, in the primary modulation, the modulation is carried out according to an ordinary narrow-band modulation system, for example, PSK (Phase Shift Keying) or FSK (Frequency Shift Keying). In the secondary modulation, a primary modulation signal is multiplied by a PN code for a transmission process. The PN code for the transmission process is generated in the transmission process PN code generating section 5 and then supplied to the diffusion modulation section 3. The chip rate of the PN code for the transmission process is considerably high, whereby a bandwidth of a signal becomes wide. A ratio of the bandwidth after the secondary modulation to the bandwidth before the secondary modulation is a degree of spectrum diffusion. Signals after the secondary modulation are sent to the RF output section 7 and transmitted through an antenna 9.

Here, the constitution of the transmission process PN code generating section 5 differs from the conventional constitution in the following points. The transmission process PN code generating section 5 according to this embodiment is constituted such that two kinds of transmission process PN codes for high speed communication and low speed communication can be generated. The chip rate of the PN code for high speed communication is higher than that of the PN code for low speed communication. Both of these PN codes are used appropriately depending on the traveling speed of vehicle as will be described later.

Further, the communication equipment loaded in a vehicle is composed of a diffusion demodulation section 11, an RF receiving section 13, and reception process PN code generating section 15, and this is the same constitution as that of conventional CDMA communication devices. Input signals reaching the antenna 9 are inputted into the diffusion demodulation section 11 via the RF receiving section 13 serving as a front-end section. In the diffusion demodulation section 11, the input signals are demodulated by a process reverse to that at the time of modulation. First, as an inverse diffusion process, an input signal is multiplied by a PN code for a reception process. Due to the multiplication, spectrum components of signals diffused in a wide band return to spectrum components of a primarily modulated wave. Signals after inverse diffusion are demodulated by a normal narrow-band system, whereby original data can be obtained.

The PN codes for reception process are generated at the reception process PN code generating section 15. As a feature of this embodiment, the constitution is such that similarly to the transmission side, the reception process PN code generating section 15 can generate two kinds of reception process PN codes for high speed communication and low speed communication. Here, the chip rate of the PN code for high speed communication is also higher than that of the PN code for low speed communication. Both of the PN codes are appropriately used depending on the traveling speed of vehicle.

Further, in the communication equipment to be loaded in a vehicle 1, a speed sensor 17 is installed as shown in FIG. 1. In this embodiment, a GPS device is used as the speed sensor 17. The GPS device detects a vehicle's present location using radio waves transmitted from an artificial satellite. At this time, based on a Doppler speed acquired inside the GPS device, a variation of the distance between the satellite and the vehicle can be found, and further a traveling speed of the vehicle can be found. Besides, the traveling speed may also be detected based on the variation of a value of absolute location detected by the GPS device. Further, it is preferable that the communication device of this embodiment makes the most of a GPS device which is installed in a navigation device to be loaded in a vehicle.

As an example of modification, it is preferable to use as the speed sensor 17 a traveling speed sensor for controlling engines and gears or a traveling speed sensor for speedometers. For example, a distance sensor (traveling speed sensor) which generates a pulse signal corresponding to a rotation angle of wheel is used. Similarly, an acceleration sensor can be used.

Data on the traveling speed of a vehicle detected by the speed sensor 17 is sent to a traveling speed determining section 19. The traveling speed determining section 19 is installed in a CPU, which serves as a communication control section 30, together with other components circled by a dashed line in FIG. 1. In the traveling speed determining section 19, a traveling speed of vehicle is compared with a prescribed speed value. When it is judged that the traveling speed of vehicle crosses the prescribed speed value (from high to low speed or vice versa), the results of judgment are sent to a data communication speed change request section 21. Accordingly, it the traveling speed of vehicle is lower than the prescribed speed value, high speed communication can be performed in a stable manner. Accordingly, if the traveling speed of vehicle becomes low and crosses the prescribed speed value, the data communication speed change request section 21 will generate a request for change of the communication speed to high speed. On the other hand, if the traveling speed of vehicle rising upward crosses the prescribed speed value, it will be difficult to perform normal high speed communication equivalent to that at the time of traveling at a low speed. Thus, the communication speed will have to be decreased, whereby a request for change of the communication to low speed will be generated.

Figure 2:
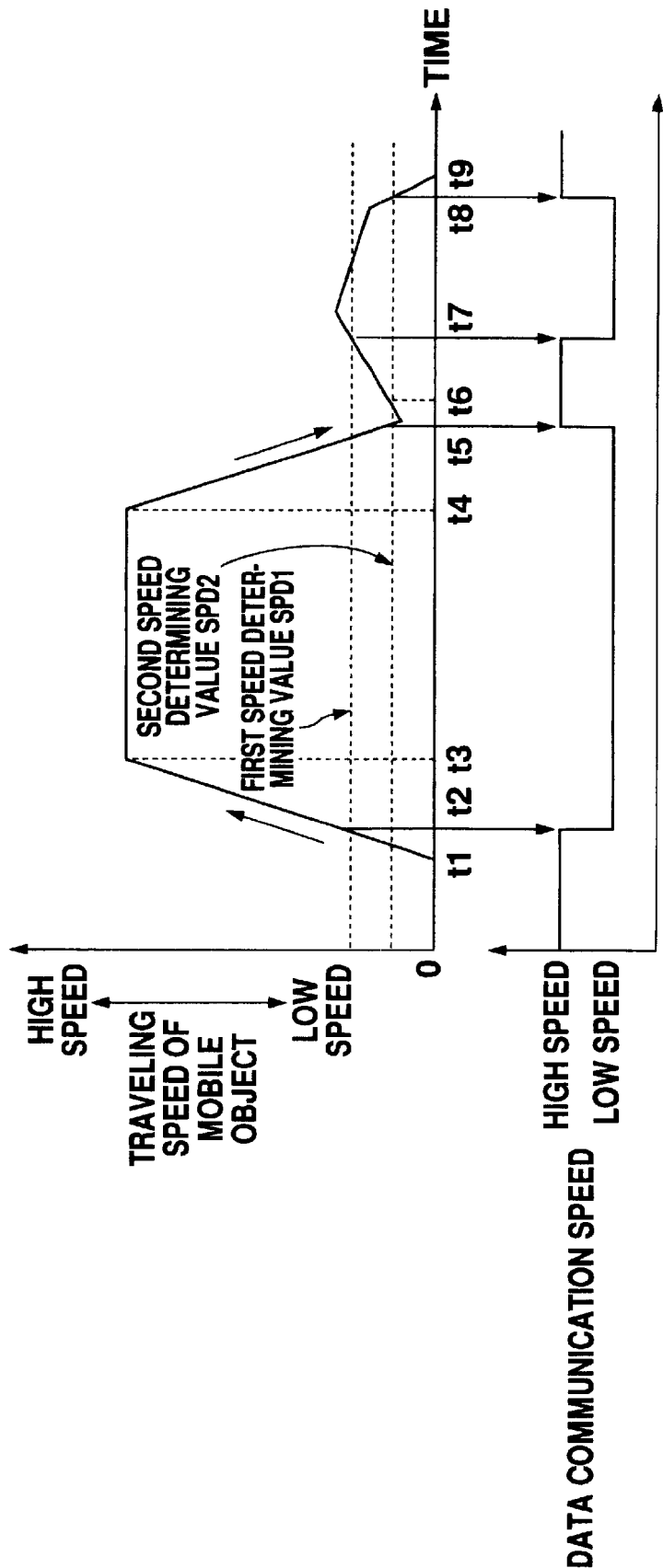
FIG. 2 shows hysteresis characteristics in the process of comparing a traveling speed of vehicle with a predetermined speed value.

Here, as shown in FIG. 2, a certain hysteresis characteristic is specially provided to the traveling speed determining section 19. Thus, frequent changes of the communication speed can be prevented. As shown in the drawing, two speed determining values, namely, a first speed determining value SPD 1 and a second speed determining value SPD 2 are set. The first speed determining value SPD 1 is used when the traveling speed shifts from zero, namely the mobile object being at a standstill, or low to high speed (acceleration). On the other hand, the second speed determining value SPD 2 is used when the traveling speed shifts from high to low speed or zero, namely the mobile object comes to a halt (deceleration). The SPD 1 is larger than the SPD 2.

For example, at a point of time t2 in FIG. 2, the traveling speed of vehicle exceeds the first speed determining value SPD 1. At this time, a signal 19a representing that the traveling speed of vehicle has crossed the first speed determining value SPD 1 is sent from the traveling speed determining section 19 to the data communication speed change request section 21. Further, at a point of time t5, a signal 19b representing that the traveling speed of the vehicle falls below the second speed determining value SPD 2 is outputted from the traveling speed determining section 19.

Such a hysteresis characteristic leads to prevention of frequent repetition (hunting) of changing the communication speed at the time of fluctuation of the traveling speed of vehicle resulting from crossing upward or downward near a detection threshold value. Therefore, stable communication is secured.

Further, with regard to the hysteresis characteristic, the following setting is preferable. Here, consideration is given to a duration of waiting for an actual change of the communication speed which takes place in response to results of the judgment by the traveling speed determining section 19. If the duration of waiting for the actual change is long due to the occurrence of time delay in a process of changing the communication speed, the traveling speed of the vehicle will be changed during the changing process. Then, the first speed determining value SPD 1, which is a criterion for the acceleration, is set lower. Thus, it prevents the communication becoming unstable or difficult due to acceleration of the traveling speed during the time period of waiting for the change. Further, the second speed determining value SPD 2 is set to the side of higher traveling speed. Since the changing process is commenced earlier, a change to the high speed communication can be completed by the time the traveling speed becomes sufficiently low. Therefore, the high speed communication can be continued as long as possible.

Further, when the process is carried out by the traveling speed determining section 19, it is preferable to provide a dead band for a certain period of time. For example, if the traveling speed determining section 19 detects that the traveling speed of the vehicle crosses the first speed determining value SPD 1, when a certain period of time has elapsed after the detection, data concerning the detection 19a will be sent to the data communication speed change request section 21. If the traveling speed of the vehicle crosses the SPD 1 again before the certain period of time completely elapses, the signal 19a will not be outputted. The same thing applies to the case of the second speed determining value SPD 2. Thus, hunting in changing the communication speed is further reduced. The dead period may be provided for the process of the data communication speed change request section 21. In this case, generation of request for the change is delayed for a certain period of time. The dead period may be processed by any arbitrary component other than the traveling speed determining section 19 and the data communication speed change request section 21 described above.

The subject is then returned to FIG. 1. The data communication speed change request section 21 sends a request for a change of the communication speed (to either high or low speed) to a transmission data control section 23. The transmission data control section 23 sends signals to the diffusion modulation section 3 so as to control data transmission. In particular, the transmission data control section 23 performs a process relating to a control channel to control the communication with the base station. The transmission data control section 23 provides the diffusion modulation section 3 with data to be sent through the control channel, and the data is transmitted to the base station. Also, a request for a change of the communication speed is sent to the base station using the control channel.

As an example of modification, it is also preferable for the request for a change of the communication speed to be transmitted by other means than the control channel. For example, the request for a change of the communication speed may be attached to a header of the data to be transmitted.

Next, the constitution of the base station 50 will be described. The base station 50 is provided with a diffusion modulation section 52, a transmission process PN code generating section 54, an RF output section 56, a diffusion demodulation section 58, an RF reception section 62, and a reception process PN code generating section 64. This constitution is same as the corresponding constitution on the vehicle side. PN codes for transmission process on the vehicle side and PN codes for reception process on the base station side have to be the same. Similarly, PN codes for transmission process on the base station side and PN codes for reception process on the vehicle side have to be the same. Further, in the transmission process PN code generating section 54 and the reception process PN code generating section 64, two kinds of PN codes for high speed communication and low speed communication can be used, similarly to the case on the vehicle side.

A control channel data decoding section 66 is installed in a CPU, which is served as a communication control section 80, together with other components circled by a dashed line in FIG. 1. Control data transmitted through the control channel is inputted into the control channel data decoding section 66 by way of the diffusion demodulation section 58. The control channel data decoding section 66 decodes the control data. By using the control data, the communication is controlled. The request for a change of the communication speed transmitted from the vehicle is decoded here.

The request for a change of the communication speed is sent from the control channel data decoding section 66 to a data communication speed change/response section 68. The data communication speed change/response section 68, according to the request for the change, gives instructions on PN codes to be used from now on to the transmission process PN code generating section 54 and the reception process PN code generating section 64. As described above, the chip rate of the PN code for high speed communication is higher than that of the PN code for low speed communication. If the chip rate becomes high, the communication speed will become high.

Results of judgment made by a communication error determining section 70 are taken into consideration in the process in the data communication speed change/response section 68. In the communication system according to this embodiment, an error correcting code, for example CRC (Cyclic Redundancy Check) or parity check, is used to cope with random noise. The communication error determining section 70 finds an error occurrence rate (frequency of occurrence of error) in an error correcting process. It is then determined whether or not the error occurrence rate within the past prescribed time period is higher than a prescribed reference value. Thus, it is determined whether or not the communication error is kept low. Based on results of the judgment, the data communication speed change/response section 68 cancels the change to high speed communication when the communication error occurrence rate is high.

When the data communication speed change/response section 68 gives the transmission process PN code generating section 54 and the reception process PN code generating section 64 instructions to change the PN code, at the same time it transmits a change request response signal to a control channel data transmission section 72. In the change request response signal, the PN code to be used after the change is shown. In the control channel data transmission section 72, control data to be sent to the vehicle through the control channel is processed. The control data is sent to the diffusion modulation section 52 and then transmitted from the RF output section 56 to the vehicle. The communication speed change request response signal is also sent to the vehicle through the control channel.

Next, the constitution on the vehicle side will be discussed. The communication control section 30 on the vehicle side is further provided with an input data control section 25 to process the data demodulated in the diffusion demodulation section 11. The control data sent through the control channel is sent from the diffusion demodulation section 11 to the input data control section 25. The input data control section 25 checks whether or not the control data contains the change request response signal. The change request response signal is sent to a data communication speed change control section 27. In the change request response signal, the PN code to be used after the change is shown. The data communication speed change control section 27 gives the transmission process PN code generating section 5 and the reception process PN code generating section 15 instructions to use the PN code. Due to the change, the PN code for transmission process on the base station side and the PN code for reception process on the vehicle side become the same, and also the PN code for reception process on the vehicle side and the PN code for transmission process on the vehicle side become the same. According to these new PN codes, processes in the modulation section and the demodulation section on each side are changed, thereby changing the communication speed.

Figure 3:
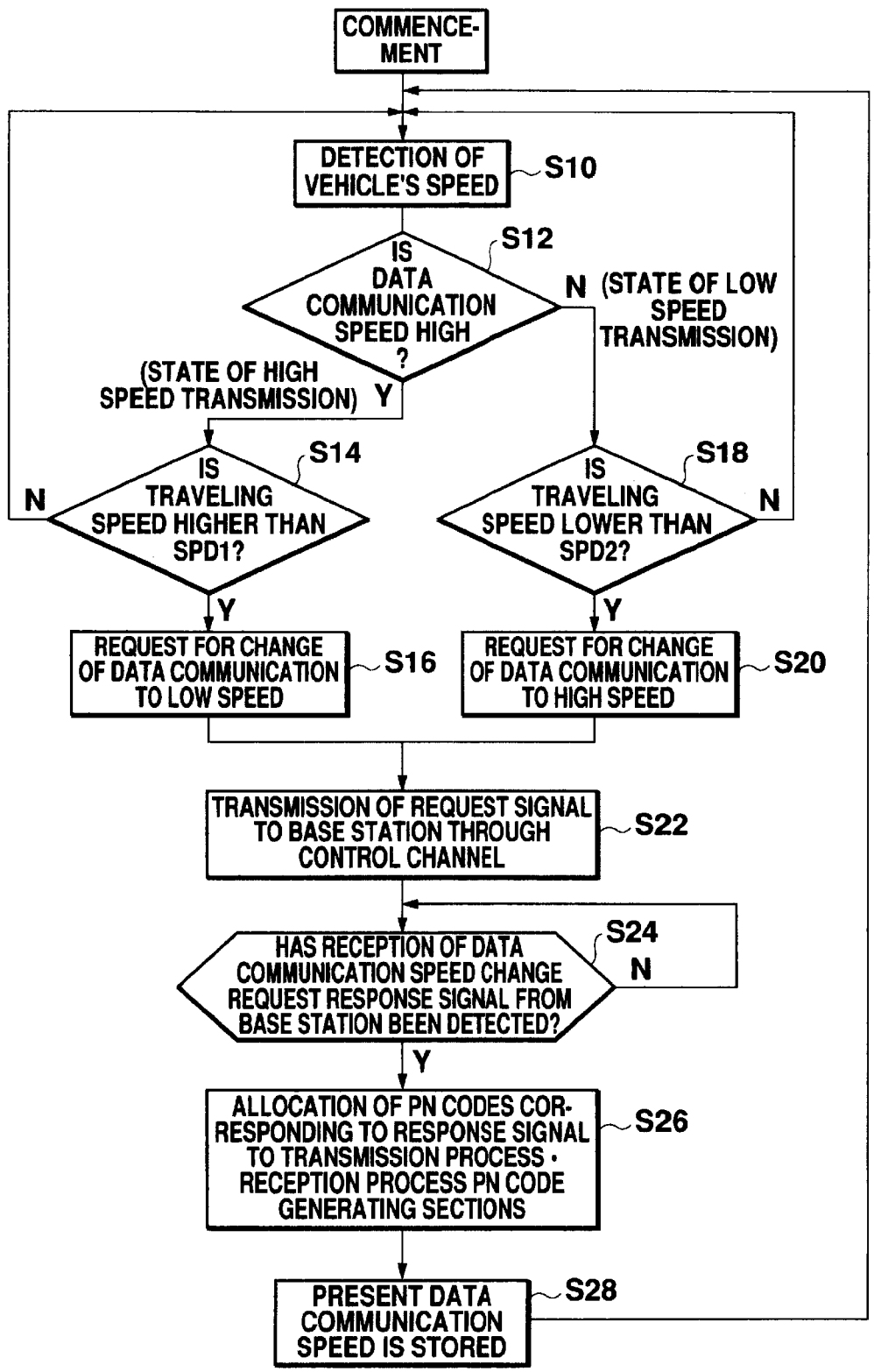
FIG. 3 is a flowchart showing the process on a vehicle side of the system shown in FIG. 1.
Figure 4:
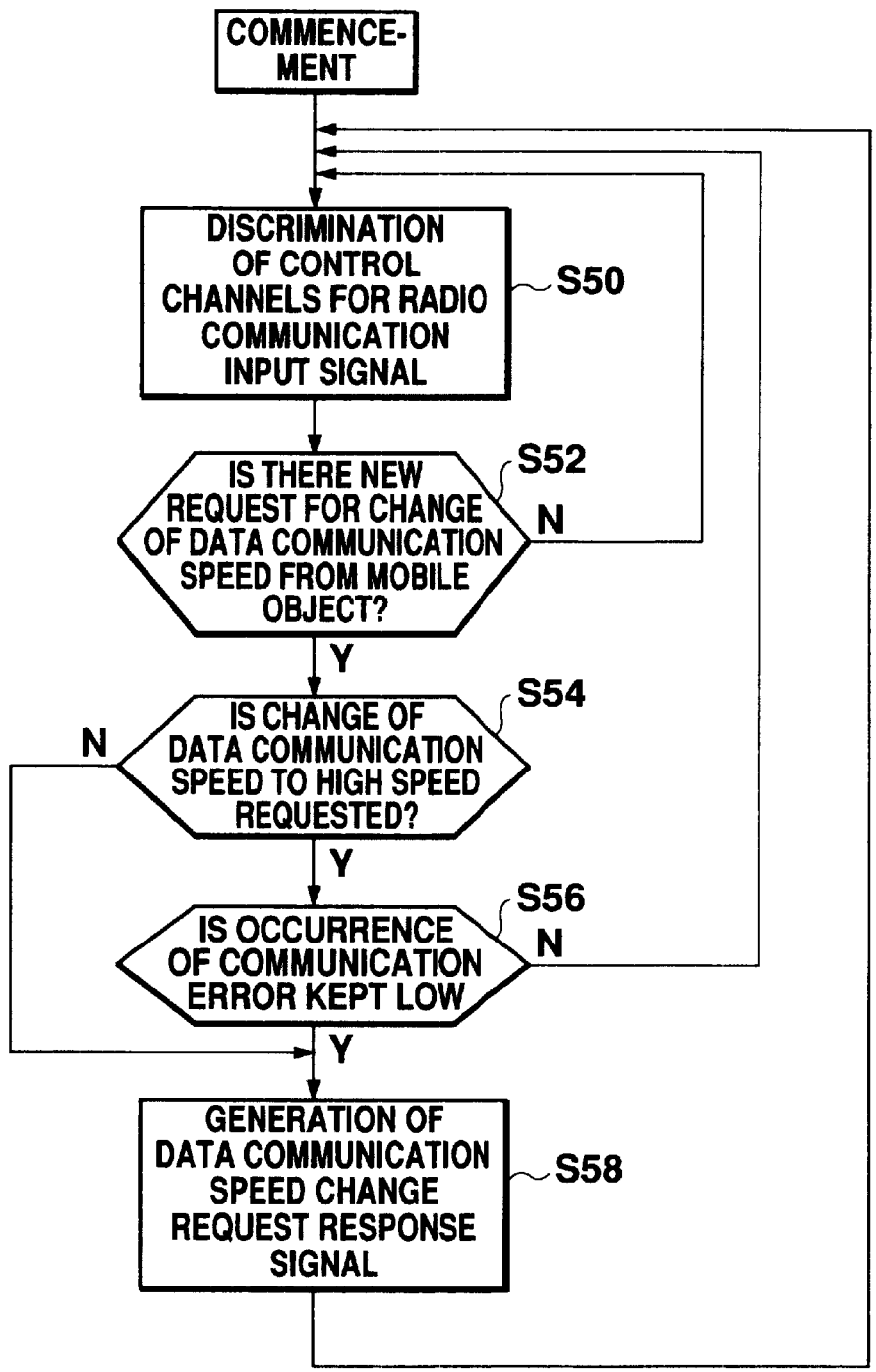
FIG. 4 is a flowchart showing the process on a base station side of the system shown in FIG. 1.

Next, with reference to FIGS. 3 and 4, a process of changing the communication speed in the system shown in FIG. 1 will be described. FIG. 3 shows the process on the vehicle side, while FIG. 4 shows the process on the base station side.

In FIG. 3, when the communication starts, the speed sensor 17 detects the traveling speed of vehicle (Step 10). The traveling speed determining section 19 determines whether or not the present data communication speed is high (Step 12). If the data communication speed is high, it will be determined whether or not the present traveling speed of the vehicle is higher than the first speed determining value SPD 1 (Step 14). The response "YES" means that the traveling speed is increased at the time of low speed traveling and high speed communication and the traveling speed has crossed the first speed determining value SPD 1. Then, the data communication speed change request section 21 generates a request for a change of the data communication speed to low speed based on results of the judgment (Step 16). If the response is "NO" at Step 14, the program will return to Step 10.

On the other hand, if it is determined at Step 12 that the transmission speed is low, the program will advance to Step 18. At Step 18, it is determined whether or not the present traveling speed is lower than the second speed determining value SPD 2. The response "YES" means that the traveling speed is decreasing at the time of high speed traveling and low speed communication and the traveling speed has crossed the second speed determining value SPD 2. The data communication speed change request section 21 then generates a request for a change of the communication speed to high speed (Step 20). If the response is "NO" at Step 18, the program will return to Step 10.

The transmission data control section 23 transmits the request for the change generated at Step 16 or Step 20 to the base station 50 through the control channel (Step 22). Transmission of the request for the change is continued until a response is sent from the base station 50.

In FIG. 4, the control channel data decoding section 66 discriminates the control channel for input signals of radio communication on the base station side after commencement of the communication (Step 50). Control data sent through the control channel is decoded and it is determined whether or not the control data contains a new request for change (request for a change of the data communication speed) (Step 52). If the request for change is not sent, the program will return to Step 50. If the response is "YES" at Step 52, the request for change will be sent to the data communication speed change/response section 68. It is then determined which is indicated by the request for change, change to high speed or change to low speed (Step 54).

In the case of request for a change of the communication speed to high speed, it is determined at Step 56 whether or not a communication error is kept low. This determination is made by the communication error determining section 70, and results of the determination are sent to the data communication speed change/response section 68. If the communication error occurrence rate is high, there will be a possibility of causing an increment of the occurrence of error when the communication speed is accelerated. Thus, the communication speed will not be changed and the program will return to Step 50. In this case, the vehicle continues to send the request for change. Therefore, the aforementioned processes up to Step 56 will be repeated, and the program will advance to Step 58 when the communication error occurrence rate becomes low.

If the communication error occurrence rate is low at Step 56, the program will advance to Step 58. According to the request for change, instructions to generate the PN code for high speed communication are given to the transmission process PN code generating section 54 and the reception process PN code generating section 64. In the diffusion modulation section 52 and the diffusion demodulation section 58, high speed communication processes corresponding to the new PN code are commenced. Further, a change request response signal showing that a response to the request for change has been made is generated and transmitted to the control channel data transmission section 72. The change request response signal is sent to the vehicle using the control channel.

On the other hand, if the response is "NO" (request for a change of the communication speed to low speed) at Step 54, the subsequent processes will be as follows. In this case, an affirmative determination is originally made at Step 12 shown in FIG. 3, and high speed communication is carried out at present. In this case, the communication speed is decreased, so that the process of judgment on error at Step 56 is not required. The program then advances from Step 54 to Step 58. According to the request for change, instructions to generate the PN code for low speed communication are given to the transmission process PN code generating section 54 and the reception process PN code generating section 64. In the diffusion modulation section 52 and the diffusion demodulation section 58, low speed communication processes corresponding to the new PN code are commenced. Here, a change request response signal is also sent to the vehicle using the control channel.

The process then returns to FIG. 3. The program awaits reception of the change request response signal (Step 24) after transmission of the request for change (Step 22) on the vehicle side. The change request response signal is sent together with the control data. The input data control section 25 detects the change request response signal which is contained in the control data. In the change request response signal, the PN code to be used after the change is shown. The data communication speed change control section 27 allocates PN codes corresponding to the change request response signal to the transmission process PN code generating section 5 and the reception process PN code generating section 15 (Step 26). In the transmission process PN code generating section 5 and the reception process PN code generating section 15, the PN code is revised. According to the PN code revised, the diffusion modulation section 3 and the diffusion demodulation section 11 change the communication speed. The present communication speed after the change is stored in a memory of the communication control section 30 (Step 28). The program then returns to Step 10. This concludes the changing processes of the communication speed so as to cope with variation of the vehicle's speed.

Figure 5:
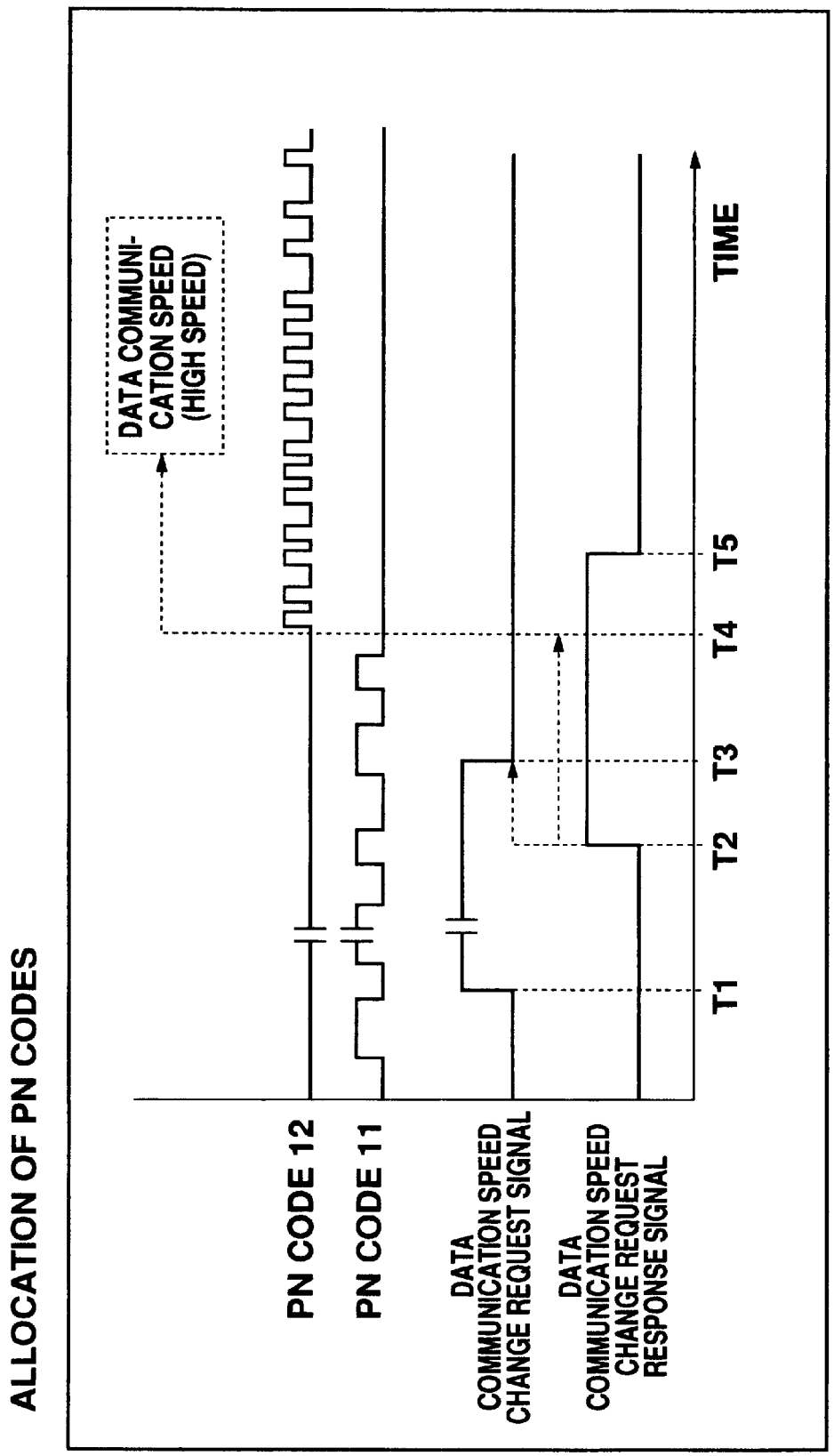
FIG. 5 is a time chart showing a change of PN codes at the time of changing communication speed from low to high speed.

FIG. 5 shows a variation of the PN code at the time of changing the communication speed from low to high speed. Initially, the vehicle travels at a high speed and a PN code 11 for low speed communication is used. In the case of traveling at a high speed, fluctuation of the Doppler shift resulting from variation of the traveling speed is great. However, with regard to the PN code 11, its chip rate is sufficiently low and chip time is sufficiently long. Fluctuation of the Doppler shift is relatively small compared with the chip time. Therefore, without receiving detrimental influence from the Doppler shift, satisfactory communication can be performed.

When the traveling speed of vehicle is decelerated from the aforementioned state and the traveling speed becomes lower than the second speed determining value SPD 2, a data communication speed change request signal is generated as shown in FIG. 5 (T1). The request signal is generated at the vehicle and sent to the base station. At the base station, when the request for change is detected in the control channel data, a data communication speed change request response signal to respond the request is generated (T2). This response signal is sent from the base station to the vehicle. In the vehicle, when receiving the change request response signal, transmission of the request signal is terminated (T3). Change to the PN code for high speed communication is performed at a prescribed timing (T4). When it is found that the communication speed has been satisfactorily changed, generation of the change request response signal is terminated (T5).

After T4, a high speed data transmission is carried out. With regard to a PN code 12 used here, its chip rate is high and chip time is short as shown in the drawing. On the other hand, since the traveling speed is low or zero, fluctuation of the Doppler shift is small. Therefore, fluctuation of the Doppler shift is sufficiently small compared with the chip time. Even though the chip rate is high, the Doppler shift will not exert a bad influence, whereby satisfactory high speed data communication will be carried out.

A similar process to that shown in FIG. 5 described above is also carried out in the change of communication speed from high to low speed.

Next, with reference to FIG. 2 again, how the communication speed is changed as the traveling speed varies will be described. In FIG. 2, the vehicle is at a standstill before time t1 and therefore high speed communication is performed. At time t1, the vehicle starts acceleration, and the traveling speed then exceeds the first speed determining value SPD 1 at time t2. At this time, a change request signal and a change request response signal are exchanged between the vehicle and the base station, and the data communication speed is changed to low speed. After time t2, the PN code for low speed communication is used. After that, the acceleration is terminated at time t3, deceleration starts at time t4, and the traveling speed becomes below the second speed determining value SPD 2 at time t5. At this time, the communication speed is changed to high speed.

Immediately after that, acceleration is commenced again. However, even though the traveling speed exceeds the second speed determining value SPD 2, the communication speed will not be changed (t6). Due to the effect of application of hysteresis characteristic to the traveling speed determining section 19, intricate changes of the communication speed is preferably prevented. When the traveling speed exceeds the first speed determining value SPD 1 (t7), the communication speed is changed to low speed again. The communication speed is then changed to high speed as the vehicle is decelerated (t8). This high speed communication continues even after the vehicle comes to a halt (t9).

As described above, according to this embodiment, the chip rate of PN code is changed according to the traveling speed of vehicle and the communication is performed at a speed corresponding to the chip rate. In order not to receive influence from the Doppler shift, chip rates of PN codes for low speed communication and high speed communication are appropriately provided. Therefore, satisfactory communication is performed in the whole traveling speed range, and as high a communication speed as possible can be realized at each traveling speed. The communication speed of a mobile station for vehicles becomes close to the communication speed of a mobile station to be used in a static state. Thus, a difference in environment of mobile computing between these two stations is reduced.

According to this embodiment, two PN codes 11 and 12 having a different chip rate, respectively, are used in changing the communication speed. These two PN codes may be those which vary only with their chip rates. Also, both of these PN codes may be completely different types (revision of chip rate itself).

Further, in changing the communication speed, a bandwidth may be changed. If the chip rate is changed as described above, the communication speed will be changed accordingly. Further, if the chip rate is changed, the bandwidth of a communication signal will be changed. Thus, in order to change the bandwidth, it is effective to change the chip rate.

An example of modification of this embodiment will be described. According to the aforementioned embodiment, the traveling speed is detected using the speed sensor 17. In this example of modification, the traveling speed is detected using other means. For example, the traveling speed of the vehicle is detected based on the position of a gear shift lever. If the shift lever is at a neutral, parking, or reverse position, it will be determined that the traveling speed is low. If the shift lever is at a drive position, it will be determined that the traveling speed is high. Further, for example, the traveling speed is determined based on the ON or OFF state of a parking brake (including a foot type brake). If it is ON, it will be determined that the traveling speed is low (at a halt). It is also preferable to utilize these ways of determination according to the example of modification together with values detected by the aforementioned speed sensor 17.

Further, according to this embodiment, the vehicle sends a request for change to the base station. The program then awaits a response from the base station, and the communication speed on the vehicle side is changed after reception of the response. In this example of modification, the vehicle changes its communication speed at a certain timing after transmitting the request for change. In FIG. 1, the data communication speed change request section 21 sends the request for change to the transmission data control section 23 and the data communication speed change control section 27. Instructions to generate a PN code corresponding to the request for change are given to the transmission process PN code generating section 5 and the reception process PN code generating section 15. On the other hand, on the base station side, the communication speed is changed so as to correspond to the request for change as described above. In such a manner, the vehicle changes the communication speed without using a response from the base station as a trigger. The advantages of the present invention can be preferably obtained from this example of modification.

Further, according to this embodiment, the mobile station is communication equipment to be loaded in a vehicle. However, the present invention is not restricted to the constitution described above. The present invention is preferably applied to any mobile station to be installed in a mobile object traveling at a high speed other than the aforementioned constitution. Further, the present invention is also preferably applied to portable terminals to be carried by users and to be used in high-speed mobile objects, such as a vehicle. Needless to say, it is also preferable to apply the present invention to a communication system for indefinite mobile stations of every kind, such as a type to be loaded in a vehicle or a portable type.

The examples of modification described above can be optionally applied to the following embodiments.

Second Embodiment

A preferred second embodiment of the present invention will be described in the following. According to the first embodiment described above, the chip rate of a PN code is changed at the time of changing the communication speed. However, according to the second embodiment, the chip rate is not changed and the number of PN codes is changed as follows.

The communication system according to this embodiment has the constitution shown in FIG. 1 similarly to the first embodiment. However, the former uses four PN codes simultaneously, unlike the latter.

Figure 6:
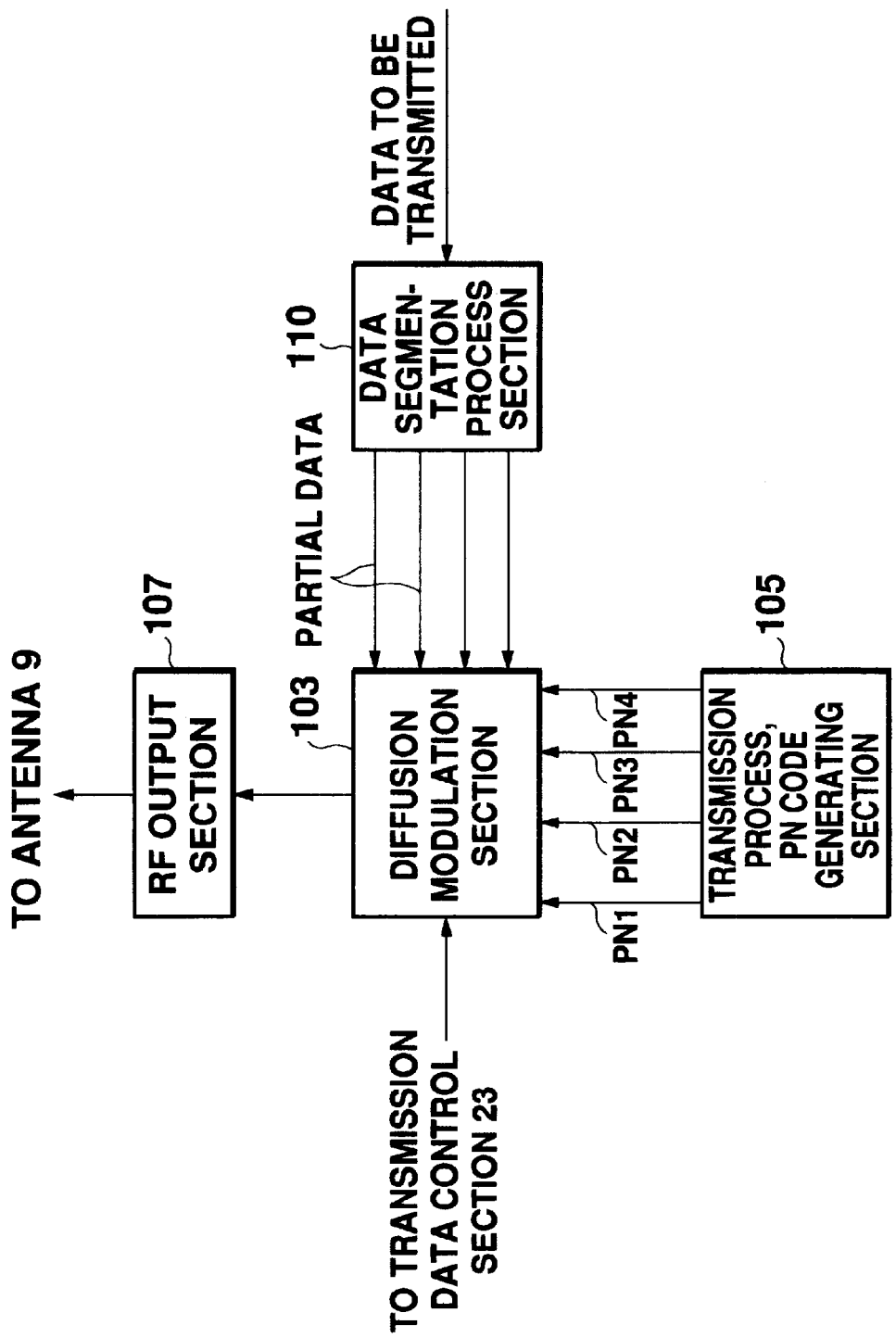
FIG. 6 shows the constitution for simultaneously processing a plurality of PN codes in the system according to a second embodiment.

FIG. 6 shows a constitution relating to transmission on the vehicle side according to this embodiment. A diffusion modulation section 103, a transmission process PN code generating section 105, and an RF output section 107 are provided. Data to be transmitted is inputted to a data segmentation processing section 110 which is a previous processing stage of the diffusion modulation section 103. The data to be transmitted is segmented every certain unit quantity of data. The certain unit quantity of data is further divided into four partial data. The four partial data are sent to the diffusion modulation section 103. On the other hand, four kinds of PN codes 1, 2, 3, and 4 are generated in the transmission process PN code generating section 105. Each of these PN codes has the same chip rate as that of the PN code for low speed communication of the first embodiment. In the second modulation, each of the four partial data described above is multiplied by a different PN code, respectively. The four partial data are then simultaneously sent to the RF output section 107 and further sent to the base station via the antenna 9.

The base station has a constitution relating to reception which is similar to the aforementioned constitution. Input signals are multiplied by the aforementioned four kinds of PN codes 1, 2, 3, and 4. Multiplication of the PN code 1 leads to reverse diffusion of partial data, and this diffusion modulation is applied using the PN code 1 on the vehicle side. The same also happens with other partial data. In such a manner, the four partial data can be separately obtained. By combining the four partial data, an original certain unit quantity of data can be obtained. The aforementioned process is carried out every certain unit quantity of data.

In this system, the number of PN codes to be simultaneously used can be changed. In the transmission process PN code generating section 105 shown in FIG. 6, the number of PN codes to be sent to the diffusion modulation section 103 is changed to one or four. As occasion demands, only the PN code 1 is outputted. In this case, no data segmentation process is performed. In the diffusion modulation section 103, an ordinary process similar to that of the first embodiment is carried out. Of course, when only the PN code 1 is used, a similar step is also taken on the base station side.

The above description is about the constitution relating to transmission on the vehicle side and the constitution relating to reception on the base station side. A similar constitution is also provided to the constitution relating to reception on the vehicle side and the constitution relating to the transmission on the base station side.

As described above, according to this embodiment, four different PN codes are simultaneously processed. Thus, the communication speed becomes four times as fast as the conventional communication speed. However, if parallel processing is simultaneously applied to a plurality of PN codes while traveling at a high speed, it will be difficult to perform stable communication. This is caused by the influence of fading as described above. Thus, in this embodiment, the number of PN codes to be simultaneously used is changed according to the traveling speed.

A process of changing the communication speed in the system according to this embodiment is similar to that of the first embodiment on the whole. However, the following description will be focused on a difference in process between this embodiment and the first embodiment. Similarly to the first embodiment, the traveling speed of vehicle is compared with the speed determining value (SPD 1 or SPD 2) on the vehicle side. When the traveling speed crosses such a speed determining value, the request for change is sent to the base station. At the base station, the data communication speed change/response section 68 changes the communication speed in response to the request for change.

Supposing low speed communication is in progress and only a single PN code is used, the request for change will show the change to high speed. The data communication speed change/response section 68 will give the transmission process PN code generating section an instruction to generate four PN codes for the transmission process. It will also give the reception process PN code generating section an instruction to generate four PN codes for reception process. Further, a response signal representing that the number of PN codes is four will be sent to the vehicle. This process will be performed at Step 58 shown in FIG. 4.

This response signal is inputted to the data communication speed change control section 27 on the vehicle side. Instructions to use four PN codes are also given to the transmission process PN code generating section and the reception process PN code generating section on the vehicle side. In such a manner, a change to high speed communication which simultaneously processes four PN codes is made. This changing process is executed at Step 28 shown in FIG. 3.

A change to low speed communication is a process opposite to that described above. On the base station side, in response to the request for change, the number of PN codes to be used is reduced from four to one. Further, the change request response signal is sent to the vehicle and the number of PN codes to be used is also reduced from four to one on the vehicle side.

Figure 7:
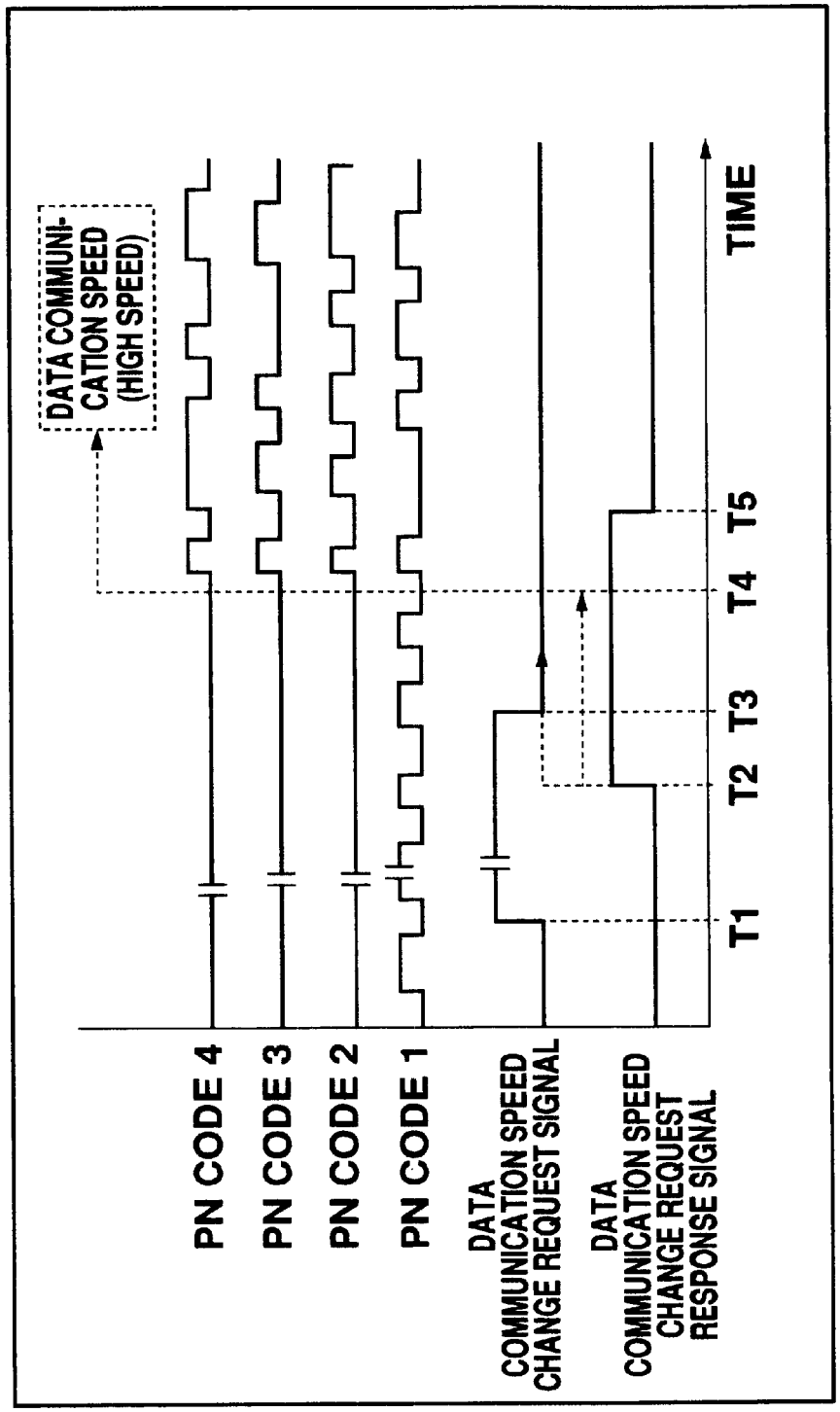
FIG. 7 is a time chart showing a change of the number of PN codes at the time of changing the communication speed from low to high speed according to the second embodiment.
Figure 8:
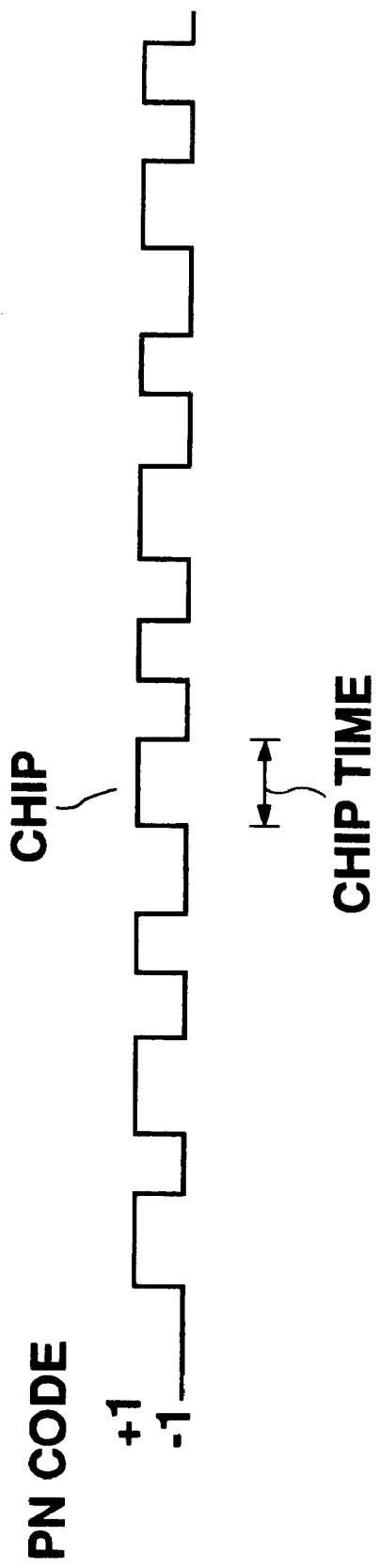
FIG. 8 shows PN codes which are used in a CDMA system based on DS system spectrum diffusion.

FIG. 7 shows a variation of the number of PN codes at the time of changing the communication speed from low to high speed. In the beginning, the vehicle is traveling at a high speed, so that only a kind of PN code 1 is used. Therefore, even during the high speed traveling, fading is not adversely influential at this time, thereby enabling very satisfactory communication. When the traveling speed of vehicle is decreased, as described with reference to FIG. 5, the request for change and the change request response are exchanged between the vehicle and the base station(T1~T3). Thus, the number of PN codes increases from one to four. After T4, four kinds of PN codes 1 to 4 are simultaneously used and the communication speed quadruples. Since the traveling speed is low, even though a plurality of PN codes are simultaneously processed, satisfactory communication can be performed without receiving bad influence from fading. A process similar to that shown in FIG. 7 is also carried out in changing the communication speed from high to low speed.

As described above, according to this embodiment, simultaneous use of a plurality of PN codes enables much speedier communication than in the conventional case. By performing appropriate control to change the number of PN codes, it is possible to avoid receiving detrimental influence due to fading which may arise from pluralization of PN codes while traveling at a high speed. Thus, it is possible to preferably obtain such an advantage of the present invention that satisfactory communication can be performed in the whole traveling speed area and a possible high communication speed is realized at each traveling speed.

In examples of modification, both change of the number of PN codes (the second embodiment) and change of the chip rate of PN codes (the first embodiment) may be performed. While traveling at a low speed, a plurality of PN codes having a high chip rate are used. While traveling at a high speed, the number of PN codes is reduced and PN codes having a low chip rate are used. Further, in this embodiment, the chip rate of each PN code does not have to be identical.

Third Embodiment

In the first embodiment mentioned above, the chip rate of PN codes is changed and the communication speed is changed accordingly. At this time, a degree of spectrum diffusion becomes large by raising the chip rate, and the communication speed becomes high. However, it is also preferable to use other methods in order to enlarge the degree of spectrum diffusion and accelerate the communication speed.

In this embodiment, the chip rate of PN codes is not changed. Instead, in the diffusion modulation section, a process to change the degree of spectrum diffusion according to the traveling speed is carried out. Thus, the communication speed can be changed. Also in the diffusion demodulation section, the process is changed in response to a change of the degree of diffusion. Similarly to the first embodiment, the change of the degree of diffusion mentioned above is carried out at the time of receiving the request for change or the change request response. The changing process in general is similar to that of the first embodiment.

As described above, also in this embodiment, the communication speed can be changed according to the traveling speed, and an advantage similar to that of the first embodiment can be obtained. It is also preferable to combine this embodiment with either the first embodiment or the second embodiment, or both.

What is claimed is:

1. A radio communication system for mobile objects, which performs a CDMA radio communication between a mobile station and a base station, said system comprising:
   traveling speed detecting means for detecting a traveling speed of the mobile station;
   determining means for comparing said traveling speed with a prescribed speed determining reference value; and
   communication speed changing means for changing a communication speed between the base station and the mobile station when the traveling speed crosses said speed determining reference value;
   wherein, in changing the communication speed, a chip rate of a PN code or a bandwidth of a communication signal is changed;
   and wherein communication can be performed simultaneously using a plurality of PN codes between the mobile station and the base station, and in changing a communication speed, the number of PN codes to be simultaneously used is changed.

2. The radio communication system for mobile objects according to claim 1, wherein the base station and the mobile station comprise:
   data segmentation means for dividing data to be transmitted into a plurality of partial data, and for changing a number of data segmentations; and
   PN code generating means for generating a plurality of different PN codes the same in number as the number of data segmentations, wherein different PN codes are respectively applied to each partial data.

3. The radio communication system for mobile objects according to claim 1, wherein, in changing a communication speed, a degree of spectrum diffusion is changed.

4. The radio communication system for mobile objects according to claim 1, wherein a speed determining reference value for determining that said traveling speed has been increased is set to be higher than a speed determining reference value for determining that said traveling speed has been decreased, and control of change is thereby carried out with a hysteresis characteristic.

5. The radio communication system for mobile objects according to claim 1, wherein a communication speed will not be changed until a prescribed dead time elapses after said traveling speed has crossed said speed determining reference value.

6. The radio communication system for mobile objects according to claim 1, further comprising:
   error detecting means for detecting occurrence of communication error, wherein when a preselected quantity of communication errors arise, a change of communication speed is restrained.

7. The radio communication system for mobile objects according to claim 6, wherein a change of communication speed to a preselected speed is restrained.

8. The radio communication system for mobile objects according to claim 6, wherein on the base station side, a process of detecting communication errors and a control change process are carried out.

9. A radio communication mobile station, which performs a CDMA radio communication with a base station, said mobile station comprising:
   traveling speed detecting means for detecting a traveling speed;
   determining means for comparing said traveling speed with a prescribed speed determining reference value; and
   communication speed changing means for changing a communication speed when the traveling speed crosses said speed determining reference value;
   wherein, in changing the communication speed, a chip rate of a PN code or a bandwidth of a communication signal is changed;
   and wherein communication with the base station can be performed simultaneously using a plurality of PN codes, and in changing a communication speed, the number of PN codes to be simultaneously used is changed.

10. The radio communication mobile station according to claim 9 further comprising:
    data segmentation means for dividing data to be transmitted into a plurality of partial data, and for changing a number of data segmentations; and
    PN code generating means for generating a plurality of different PN codes the same in number as the number of data segmentations, wherein different PN codes are respectively applied to each partial data.

11. The radio communication mobile station according to claim 9, wherein, in changing a communication speed, a degree of spectrum diffusion is changed.

12. The radio communication mobile station according to claim 9, wherein a speed determining reference value for determining that said traveling speed has been increased is set to be higher than a speed determining reference value for determining that said traveling speed has been decreased, and control of change is thereby carried out with a hysteresis characteristic.

13. The radio communication mobile station according to claim 9, wherein a communication speed will not be changed until a prescribed dead time elapses after said traveling speed has crossed said speed determining reference value.

14. The radio communication mobile station according to claim 9, wherein, when a preselected quantity of communication errors arise, a change of communication speed is restrained.

15. The radio communication mobile station according to claim 14, wherein a change of communication speed to a preselected speed is restrained.

16. The radio communication mobile station according to claim 9, wherein a change of communication speed to a preselected speed is restrained.

* * * * *